US005600797A

United States Patent [19]

Marshall

[11] Patent Number: 5,600,797
[45] Date of Patent: Feb. 4, 1997

[54] SYSTEM FOR IDENTIFYING NEW CLIENT AND ALLOCATING BANDWIDTH THERETO BY MONITORING TRANSMISSION OF MESSAGE RECEIVED PERIODICALLY FROM CLIENT COMPUTERS INFORMING OF THEIR CURRENT STATUS

[75] Inventor: Robert A. Marshall, Portland, Oreg.

[73] Assignee: Intel Corporation, Santa Clara, Calif.

[21] Appl. No.: 340,634

[22] Filed: Nov. 16, 1994

Related U.S. Application Data

[63] Continuation-in-part of Ser. No. 340,172, Nov. 15, 1994, which is a continuation-in-part of Ser. No. 157,694, Nov. 24, 1993, Pat. No. 5,506,954.

[51] Int. Cl.[6] ........................................................ G06F 13/00
[52] U.S. Cl. ........................ 395/200.11; 395/200.02; 395/200.06; 395/200.13; 395/838; 340/286.02; 340/500; 340/825.06; 340/870.01; 370/260; 370/431; 370/468
[58] Field of Search .............................. 340/827, 286.02, 340/500, 825.06, 870.01; 370/60, 94.1, 94.2, 60, 68.1, 110.1, 118; 395/650, 200.02, 200.11, 200.13, 200.06, 838

[56] References Cited

U.S. PATENT DOCUMENTS

| | | | |
|---|---|---|---|
| 4,074,232 | 2/1978 | Otomo et al. | 371/34 |
| 4,445,116 | 4/1984 | Grow | 340/825.05 |
| 4,475,193 | 10/1984 | Brown | 370/124 |
| 4,821,263 | 4/1989 | Lundh | 370/60 |
| 4,888,795 | 12/1989 | Ando et al. | 348/18 |
| 4,897,841 | 1/1990 | Gang, Jr. | 370/85.13 |
| 4,953,162 | 8/1990 | Lyons et al. | 370/94.1 |
| 4,998,243 | 3/1991 | Kao | 370/62 |
| 5,014,267 | 5/1991 | Tompkins et al. | 370/62 |
| 5,029,164 | 7/1991 | Goldstein et al. | 370/95.1 |
| 5,056,136 | 10/1991 | Smith | 380/10 |
| 5,072,442 | 12/1991 | Todd | 370/62 |

(List continued on next page.)

FOREIGN PATENT DOCUMENTS 0523629 7/1992 European Pat. Off. .

OTHER PUBLICATIONS

Eleftheriadis et al., "Algorithms and Performance Evaluation of the Xphone Multimedia Communication System." ACM Multimedia 93–Proceedings Forst ACM International Conference on Multimedia, 1 Aug. 1993, Anaheim (US).

Zhang et al., "Video Communication on LANs—Multimedia CSCW Applications." CCECE/CCGEI '93.

Ramanathan et al., "Integrating Virtual Reality, Tele–Conferencing, and Entertainment into Multimedia Home Computers". IEEE Transactions on Consumer Electronics, vol. 38, No. 2, May 1992.

Chen et al., "A Multimedia Desktop Collaboration System," Globecom 92—EEE Global Telecommunications Conference, vol. 2, 6 Dec. 1992—9 Dec. 1992. Orlando (US).

Vin et al., "Multimedia Conferencing in the Etherphone Environment." Computer, vol. 24, No. 10, Oct. 1991. Long Beach (US).

Nakamura et al., "Personal Multimedia Teleconferencing Terminal." IEEE International Conference on Communications ICC 90–Session 211. vol. 1, 15 Apr. 1990, Atlanta (US).

(List continued on next page.)

Primary Examiner—Thomas C. Lee
Assistant Examiner—Po C. Huang
Attorney, Agent, or Firm—Steve Mendelsohn; William H. Murray

[57] ABSTRACT

Client computers on a computer network send messages informing their management computer on the network of the status of transmissions such as those for conferences involving the client computers. Managers use the messages to maintain records of active transmissions to (1) discover transmissions that started without explicit authorization from the managers and (2) delete transmission records corresponding to transmissions that terminated without explicitly notifying the managers.

15 Claims, 6 Drawing Sheets

U.S. PATENT DOCUMENTS

| | | | |
|---|---|---|---|
| 5,073,926 | 12/1991 | Suzuki et al. | 348/17 |
| 5,157,491 | 10/1992 | Kassatly | 348/15 |
| 5,214,646 | 5/1993 | Yacoby | 370/85.14 |
| 5,231,492 | 7/1993 | Dangi et al. | 348/17 |
| 5,247,513 | 9/1993 | Henrion et al. | 370/60 |
| 5,249,290 | 9/1993 | Heizer | 395/650 |
| 5,263,025 | 11/1993 | Torii et al. | 370/94.2 |
| 5,285,203 | 2/1994 | Nakano | 340/827 |
| 5,287,103 | 2/1994 | Kasprzyk et al. | 340/825.52 |
| 5,289,461 | 2/1994 | De Nijs | 370/58.1 |
| 5,295,139 | 3/1994 | Palmer | 370/60 |
| 5,315,633 | 5/1994 | Champa | 348/16 |
| 5,319,793 | 6/1994 | Hancock et al. | 395/800 |
| 5,333,133 | 7/1994 | Andrews et al. | 370/58.2 |
| 5,335,321 | 8/1994 | Harney et al. | 395/162 |
| 5,367,629 | 11/1994 | Chu et al. | 395/162 |
| 5,374,952 | 12/1994 | Flohr | 348/12 |
| 5,375,068 | 12/1994 | Palmer et al. | 364/514 C |
| 5,384,598 | 1/1995 | Rodriguez et al. | 348/384 |
| 5,384,772 | 1/1995 | Marshall | 370/60 |
| 5,388,097 | 2/1995 | Baugher et al. | 370/85.5 |
| 5,390,182 | 2/1995 | Zheng | 370/85.5 |
| 5,392,223 | 2/1995 | Caci | 364/514 A |
| 5,422,883 | 6/1995 | Hauris et al. | 370/62 |

OTHER PUBLICATIONS

Maeno et al., "Distributed Desktop Conferencing System (Mermaid) Based on Group Communication Architecture." IEICE Transactions, vol. E74, No. 9, Sep. 1991, Tokyo JP.

Tanigawa et al, "Personal Multimedia–Multipoint Teleconference System." IEEE Infocom 91–Conference on Computer Communications–Session 9D, vol. 3, 7 Apr. 1991, Bal Harbour (US).

Computer Conferencing: IBM Scientists Demo Prototype of Affordable Computer Conferencing System, Nov. 2, 1992. EDGE, on & about AT&T, V7, n223, p. 22.

SYSTEM FOR IDENTIFYING NEW CLIENT AND ALLOCATING BANDWIDTH THERETO BY MONITORING TRANSMISSION OF MESSAGE RECEIVED PERIODICALLY FROM CLIENT COMPUTERS INFORMING OF THEIR CURRENT STATUS

INCORPORATION BY REFERENCE

This application is a continuation-in-part of U.S. patent application filed Nov. 15, 1994 Ser. No. 08/340,172, entitled "Synchronizing Computer Systems" of Benjamin Vrvilo, still pending which is a continuation-in-part of U.S. patent application Ser. No. 08/157,694, filed Nov. 24, 1993, now U.S. Pat. No. 5,506,954 both of which are incorporated herein in their entireties by reference. This application is related to U.S. patent application filed Nov. 16, 1994, entitled "Conferencing Over Multiple Transports" of Gunner Danheels, et al.

BACKGROUND OF THE INVENTION

1. Field of the Invention

The present invention relates to computer-based conferencing, and, in particular, to audio/video conferencing between personal computers over a computer network.

2. Description of the Related Art

It is desirable to provide audio/video conferencing between computers of a computer network. To provide audio and video playback of acceptable quality, such a conference involves the transmission of a relatively constant stream of packets of audio and video signals over the network between the computers. Since a computer network has a finite transmission bandwidth, the ability of the network to support multiple simultaneous conferences depends upon the amount of network bandwidth available for conferencing, the amount of bandwidth required for the individual conferences, and the number of conferences. If computers on the network attempt to participate in simultaneous conferences requiring too much bandwidth, the network may fail to support not only one or more of the conferences, but possibly any and all of the conferences.

It is therefore an object of the present invention to provide efficient management of the allocation of the finite bandwidth available for conferences involving computers of a computer network.

Further objects and advantages of this invention will become apparent from the detailed description of a preferred embodiment which follows.

SUMMARY OF THE INVENTION

The present invention is a computer system, comprising a management computer and one or more client computers. The management computer and the client computers are electrically interconnected over a packet-switched computer network. During transmission over the computer network, the client computer transmits messages to the management computer to inform the management computer of the status of the transmission.

The present invention is also a computer-implemented process for monitoring transmissions on a packet-switched computer network. Messages are transmitted from a client computer of the computer network to a management computer of the computer network, wherein the messages inform the management computer of transmissions involving the client computer. A record is maintained for the client computer's transmissions by the management computer in accordance with the messages from the client computer.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

Computer Network Architecture

Figure 1:
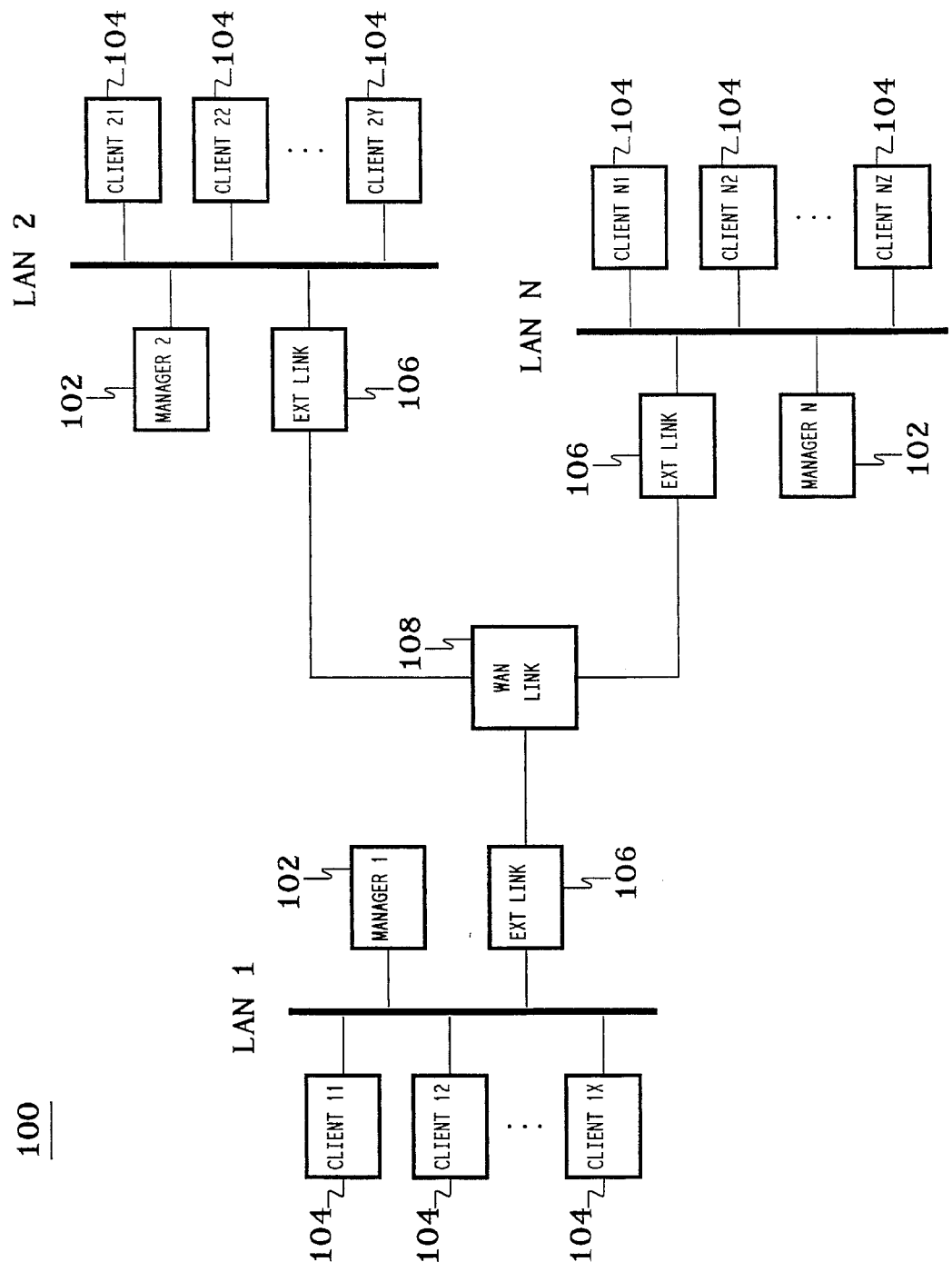
FIG. 1 is a block diagram of the architecture of a computer network, according to a preferred embodiment of the present invention.

Referring now the FIG. 1, there is shown a block diagram of the architecture of computer network 100, according to a preferred embodiment of the present invention. Computer network 100 comprises N local area networks (LAN 1, LAN 2, . . . , LAN N) that are interconnected via external links 106 and wide area network (WAN) link 108. Each LAN comprises a management computer 102 (e.g., manager 1 of LAN 1) and a plurality of client computers 104 (e.g., client 11, client 12, . . . , client 1X of LAN 1).

Management computer 102 allocates portions of network bandwidth to its client computers 104 for purposes of participating in conferences with other client computers 104 of the network. For purposes of this patent application, allocating bandwidth means granting permission to a client computer 104 to use a specified amount of bandwidth. Allocating bandwidth also implies keeping track of the sum of the bandwidths granted by a management computer 102 to its client computers 104. In a preferred embodiment, management computer 102 does not enforce or even monitor how much bandwidth its client computers 104 actually use. Management computer 102 assumes that its client computers 104 comply with its bandwidth allocations.

Management computer 102 distinguishes between two types of conferences: local and external. A local conference is a conference between client computers 104 that are associated with the same management computer 102. An external conference is one between client computers 104 that are associated with different management computers 102.

Referring again to FIG. 1, the client computers 104 of LAN 1 (i.e., clients 11, 12, . . . , 1X) are associated with manager 1; the client computers 104 of LAN 2 (i.e., clients 21, 22 . . . , 2Y) are associated with manager 2; and the client computers 104 of LAN N (i.e., clients N1, N2, . . . , NZ) are associated with manager N. An example of a local conference is one between client 11 and client 12, both of which are associated with manager 1 of LAN 1. An example of an external conference is one between client 11 of LAN 1 and client 21 of LAN 2, which are associated with different managers.

In a preferred embodiment, management computer 102 has a specified total conferencing bandwidth budget and a specified external conferencing bandwidth budget. The total conferencing bandwidth budget is the total amount of bandwidth that management computer 102 is allowed to allocate for all conferences (both local and external) on the network. The external conferencing bandwidth budget is the total amount of bandwidth that management computer 102 is allowed to allocate for external conferences on the network. These total and external conferencing bandwidth budgets are preferably programmable parameters that are specified by a network administrator (i.e., a human operator).

The selection of total conferencing bandwidth budget is preferably based on the total LAN bandwidth and the portion of that total LAN bandwidth expected to be needed for non-conferencing-related transmissions. The selection of external conferencing bandwidth budget is preferably based on the total bandwidth of the local external link 106 that is associated with the local manager and the portion of that total link bandwidth expected to be needed for non-conferencing-related transmissions over the WAN.

The external conferencing bandwidth budget is typically specified to be less than the total conferencing bandwidth budget (although, in theory, they could be equal). The specified total and external conferencing bandwidth budgets may vary from management computer 102 to management computer 102. For example, the bandwidths for manager 1 of LAN 1 are based on the bandwidths of LAN 1 and its external link. Similarly, the bandwidths for manager 2 of LAN 2 are based on the bandwidths of LAN 2 and its external link. Since the LAN and external link bandwidths may be different for LAN 1 and LAN 2, the specified total and external conferencing bandwidth budgets may also differ.

When allocating bandwidth for a new local conference within network 100 of FIG. 1, management computer 102 takes into account only the unallocated portion of its total conferencing bandwidth budget (i.e., that portion of the total conferencing bandwidth budget not already allocated to existing conferences). When allocating bandwidth for a new external conference, management computer 102 takes into account both the unallocated portion of its total conferencing bandwidth budget and the unallocated portion of its external conferencing bandwidth budget.

Initiating a Conference

Figure 2:
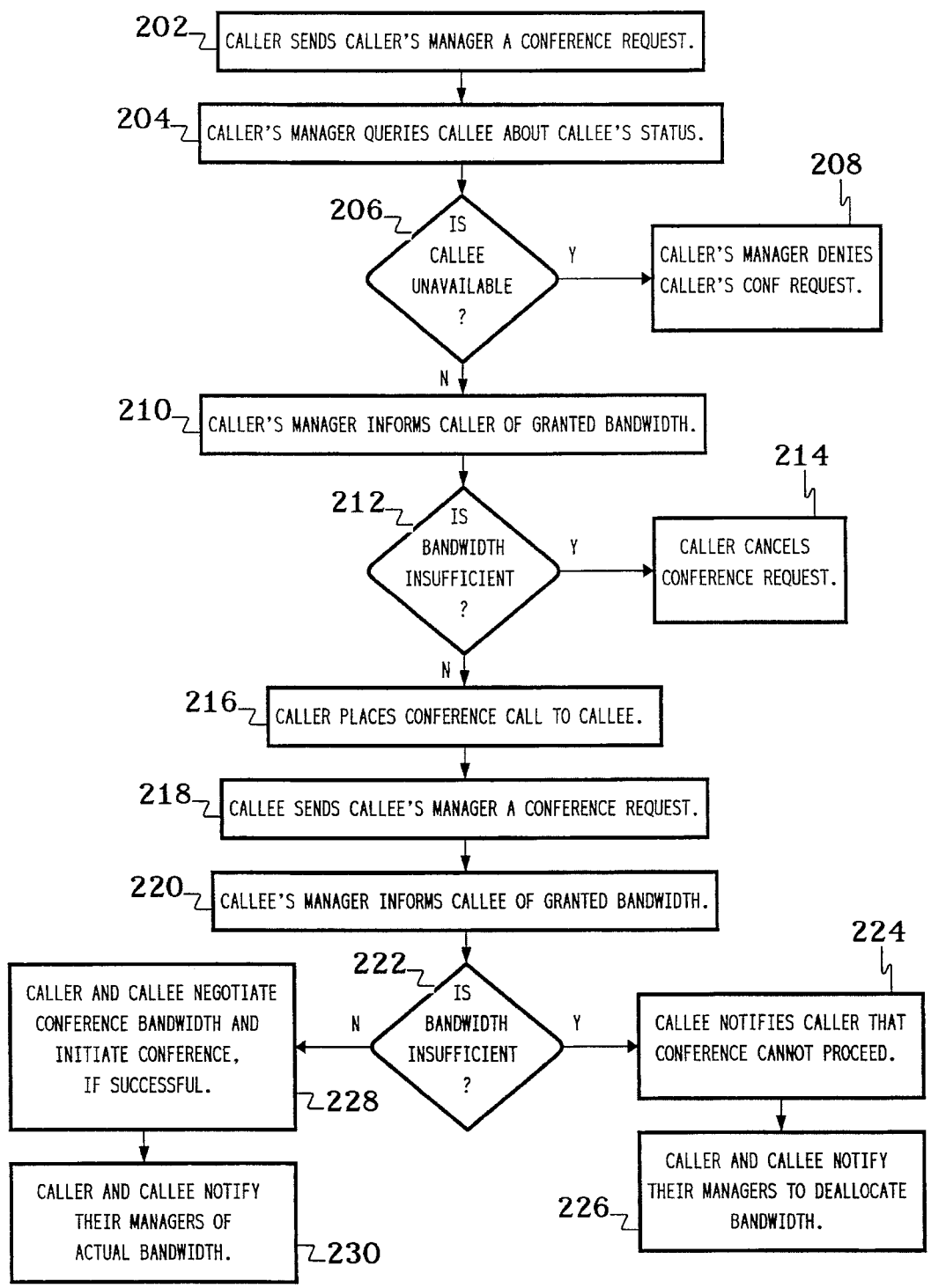
FIG. 2 is a flow diagram of the processing implemented in the computer network of FIG. 1 to initiate a conference between two client computers.

Referring now to FIG. 2, there is shown a flow diagram of the processing implemented within computer network 100 of FIG. 1 to initiate a point-to-point audio/video conference between two client computers 104, according to a preferred embodiment of the present invention. In FIG. 2, the caller is the client computer 104 that wishes to initiate a conference and the callee is the client computer 104 with whom the caller wishes to conference. FIG. 2 covers both local and external conferences. For a local conference, the caller's manager and the callee's manager are the same management computer 102. For an external conference, the caller's manager and the callee's manager are two different management computers 102 of network 100.

The caller begins the process of initiating a conference by sending its manager a conference request (step 202 of FIG. 2). In this conference request, the caller specifies its own network address, the network address of the callee, and the maximum amount of packet-switched network bandwidth it expects to consume in the course of conferencing with the callee. The amount of bandwidth requested by the caller is a function of the audio/video compression routines to be implemented by the caller.

A client computer may be able to implement compression routines that are tunable. Tunable compression routines generate different bit rates for the same conferencing sequence depending upon the selection of adjustable levels of compression. In addition or alternatively, the client computer may be able to implement two or more different compression routines. Like tunable compression routines, different compression routines may generate different bit rates for the same conferencing sequence. In a preferred embodiment, a client computer with tunable and/or different compression routines can select and control the compression routines to achieve different bit rates depending upon the type and quality of conferencing desired.

In response to a conference request from the caller, the caller's manager queries the callee about the callee's current conferencing status (step 204). In response to this management query, the callee informs the caller's manager (1) whether the callee is already in a conference and (2) who the callee's manager is (i.e., based on the manager's network address). The caller's manager uses the network address of the callee's manager to determine whether the caller's manager is the same management computer as the callee's manager. If the caller's manager determines that it is also the callee's manager, then the caller's manager knows that the caller is requesting a local conference. Otherwise, if the caller's manager determines that it is not the callee's manager, then the caller's manager knows that the caller is requesting an external conference.

If the callee is already in a conference or if the caller's manager was unable to contact the callee at all, then the caller's manager will determine that the callee is unavailable for the requested conference (step 206). In that case, the caller's manager informs the caller that the caller's conference request is denied and the conference initiation processing terminates (step 208). The caller's manager may be unable to contact the callee at all, if, for example, the callee is not on or the callee does not have the proper conferencing application software.

If the callee is available (step 206), then the caller's manager determines how much bandwidth to allocate to the caller for the conference and then informs the caller of this granted bandwidth (step 210). The determination of how much bandwidth to grant to the caller depends upon whether the requested conference is a local conference or an external conference. If the requested conference is a local conference, then the granted bandwidth will be the smallest of the following bandwidth values: (1) the amount of bandwidth requested by the caller, (2) the unallocated portion of the total conferencing bandwidth budget, and (3) an optional specified maximum bandwidth for any one conference. If the requested conference is an external conference, then the granted bandwidth will be the smallest of the following bandwidth values: (1) the amount of bandwidth requested by the caller, (2) the unallocated portion of the total conferencing bandwidth budget, (3) the optional specified maximum bandwidth for any one conference, and (4) the unallocated portion of the external conferencing bandwidth budget. Thus, the granted bandwidth may be equal to or less than the amount of bandwidth requested by the caller.

Those skilled in the art will understand that the allocation of bandwidth for a local conference may affect the unallocated portion of the external conferencing bandwidth budget. For example, assume that, at a particular instant, the unallocated portion of the total conferencing bandwidth budget is 200 Kbits/sec and the unallocated portion of the external conferencing bandwidth budget is 100 Kbits/sec. If a caller requests 150 Kbits/sec for a local conference and if the caller's manager grants the full request, then the remaining unallocated portion of total conferencing bandwidth budget will be (200–150) or 50 Kbits/sec. Since the unallocated portion of the external conferencing bandwidth budget preferably cannot be greater than the unallocated portion of the total conferencing bandwidth budget, the remaining unallocated portion of external conferencing bandwidth budget will also be adjusted to be 50 Kbits/sec. Thus, in this example, the allocation of bandwidth for a local conference affected the unallocated portion of the external conferencing bandwidth budget.

Those skilled in the art will also understand that the granted bandwidth may be zero. This will occur for a requested local conference when all of the total conferencing bandwidth budget has already been allocated to other existing conferences. For a requested external conference, the granted bandwidth will be zero when all of the external conferencing bandwidth budget has already been allocated to other conferences.

If the caller determines that the amount of granted bandwidth is insufficient for its conferencing needs (step 212), then the caller informs the caller's manager that it is canceling its conference request and the processing of FIG. 2 terminates (step 214). In a preferred embodiment where the caller can operate at only one conferencing bandwidth, if the caller does not get its full request from the caller's manager, the caller cancels its conference request. In an alternative preferred embodiment in which the caller can participate in conferences at bandwidths less than what it initially requested from the caller's manager, the caller may be able to proceed with a lesser amount of bandwidth than it initially requested.

If the amount of granted bandwidth is sufficient (step 212), then the caller initiates a conference call directly to the callee using its conference application software (step 216). In a preferred embodiment, as part of this call, the caller informs the callee of the amount of bandwidth granted to the caller by the caller's manager. In an alternative preferred embodiment, the caller does not inform the callee of the caller's granted bandwidth.

In response to the call from the caller, the callee sends its manager a conference request (step 218). In this conference request, the callee specifies its own network address, the network address of the caller, and the maximum amount of packet-switched network bandwidth it expects to consume in the course of conferencing with the caller. The caller request of step 202 and the callee request of step 218 are alike in that they both request a particular bandwidth and include both the caller's address and the callee's address.

In a preferred embodiment, the amount of bandwidth requested by the callee from the callee's manager is independent of the amount of bandwidth granted to the caller by the caller's manager. In this preferred embodiment, the amount of bandwidth requested by the callee may be less than, equal to, or greater than the amount of bandwidth already granted to the caller. In an alternative preferred embodiment in which the callee knows how much bandwidth was granted to the caller, the callee never asks its manager for more bandwidth than was granted to the caller.

In response to the request from the callee, the callee's manager determines how much bandwidth to allocate to the callee for the conference (step 220). The callee's manager compares the identities of the caller and callee to its list of active conferences (which includes those conferences currently in the process of being requested) to determine whether the callee's manager is the caller's manager. Based on this determination, the callee's manager knows whether to treat the requested conference as a local conference or an external conference.

If the requested conference is a local conference, then the callee's manager preferably always grants permission for the conference and always grants the full amount of requested bandwidth. In a local conference, the callee's manager is free to grant the full amount even though the callee's requested bandwidth may be greater than the bandwidth previously granted by the manager to the caller (in step 210), because the caller and callee will subsequently negotiate an actual bandwidth that preferably can be no larger than the smaller of the two bandwidths granted by the manager to the caller and the callee. (See step 228 below.) For a local conference, the callee's manager does not adjust the unallocated portions of the total and external conferencing bandwidth budgets, since they will have already been adjusted when the caller requested bandwidth.

If the requested conference is an external conference, then the callee's manager makes an independent determination of how much bandwidth to allocate to the callee in a manner similar to that implemented by the caller's manager when the caller requested bandwidth for the conference, as described above for step 210.

The callee then determines whether the amount of bandwidth granted by the callee's manager is sufficient for its conferencing needs (step 222). If not, then the callee notifies the caller that the conference cannot proceed (step 224). In that case, the callee and the caller notify their respective managers that the conference will not proceed and the managers then deallocate the respective granted bandwidths (step 226). Those skilled in the art will understand that, in the case of a local conference, the manager is the same for the caller and callee and, therefore, recognizes that it should only deallocate the granted bandwidth once. After step 226, the processing of FIG. 2 terminates.

If the callee determines that the granted bandwidth from the callee's manager is sufficient (step 222), then the caller and callee implement their conferencing application software to negotiate directly to determine an actual bandwidth for the conference (step 228). The negotiated actual bandwidth is preferably no greater than the smaller of the two amounts of granted bandwidth (i.e., that amount granted by the caller's manager to the caller and that amount granted by the callee's manager to the callee).

If the caller and callee successfully negotiate an actual bandwidth for their conference, then the caller and callee notify their respective managers that the conference will proceed and what the actual bandwidth for the conference will be (step 230). In a preferred embodiment, the managers adjust their bandwidth allocations if the actual negotiated bandwidth is less than the previously granted bandwidths, taking into account whether the conference is a local conference or an external conference. In an alterative preferred embodiment, the managers do not adjust their bandwidth allocations.

The notification to the managers that the conference is to proceed preferably includes the names of the users (i.e., the persons' names) of the caller and callee for display on the managers' video display monitors. The caller and callee then proceed with the conference as implemented using their conferencing software applications.

In a preferred embodiment, the connections between client computers 104 and management computers 102 use different ports from the ports used by the client computers 104 to communicate directly with one another. This allows a single computer to run both the management software and the conferencing software. That is, using different ports allows a single computer simultaneously to be a management computer 102 and a client computer 104 without having to make a connection to itself on a single port (which the preferred communications system does not support).

Figure 3:
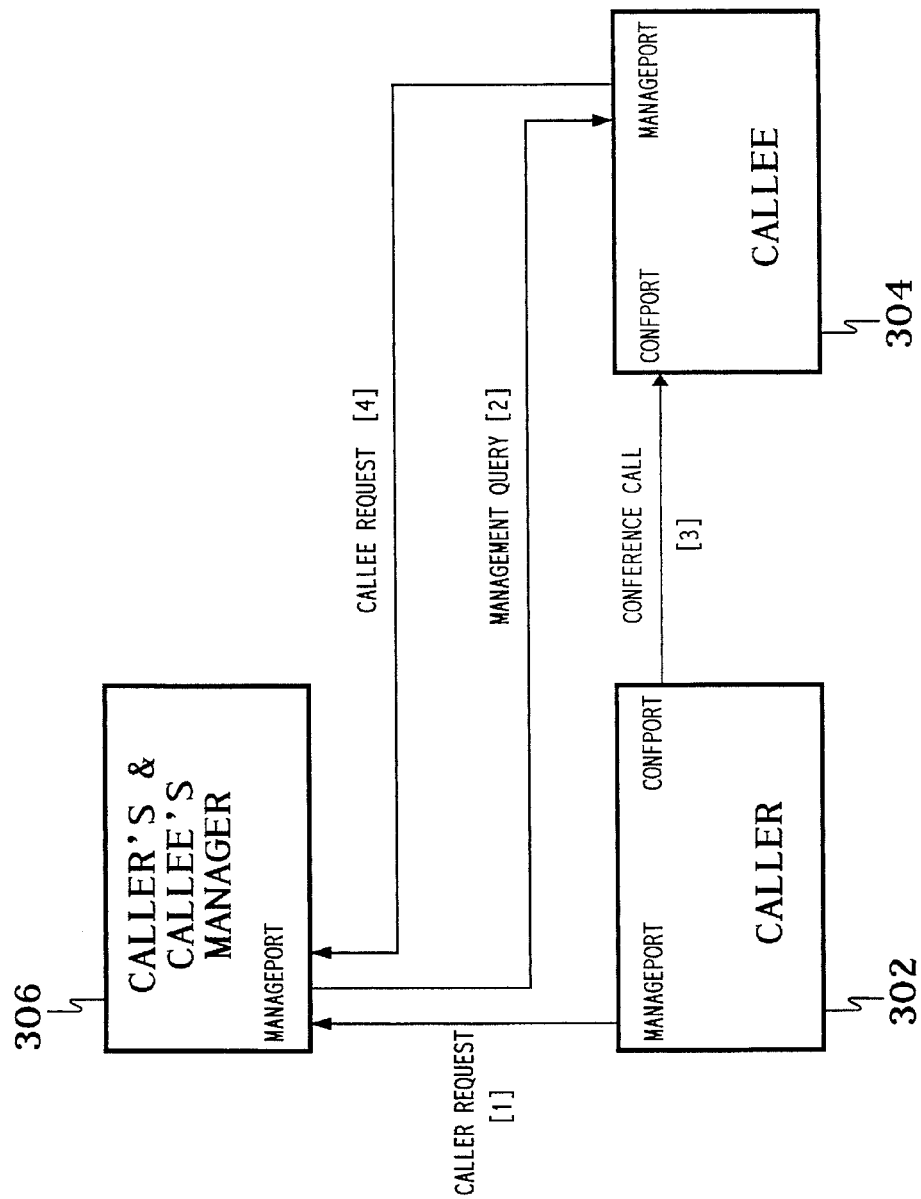
FIG. 3 is a block diagram showing the network connections made by the caller, callee, and their manager initiate a local conference.

Referring now to FIG. 3, there is shown a block diagram showing the network connections made by caller 302, callee 304, and their manager 306 to initiate a local conference, according to a preferred embodiment of the present invention. To begin the process of initiating a local conference, caller 302 initiates a caller request protocol to request permission from manager 306 for the conference. The caller request is transmitted between the management port of the caller and the management port of the manager 306.

Manager 306 then implements a management query protocol to query callee 304 about its conferencing status. The management query is transmitted between the management port of manager 306 and the management port of callee 304. If callee 304 is available and if the bandwidth granted by manager 306 to caller 302 is sufficient for caller 302's purposes, then caller 302 places a conference call to callee 304 using its conferencing software application. The conference call is transmitted between the conferencing port of caller 302 and the conferencing port of callee 304. Callee 304 then implements a callee request protocol to seek permission for the conference from manager 306. The callee request is transmitted between the management port of callee 304 and the management port of manager 306.

In a preferred embodiment, the caller request, management query, and callee request protocols are as defined later in this specification in a section entitled "Conferencing Protocols and Data Fields." In a preferred embodiment, two or more of these network connections may remain open at the same time. For example, the caller request protocol preferably remains open until the initiation of the conference is either successfully completed or terminated. Thus, the caller request protocol remains open during the calls to the management query protocol and the callee request protocol.

Figure 4:
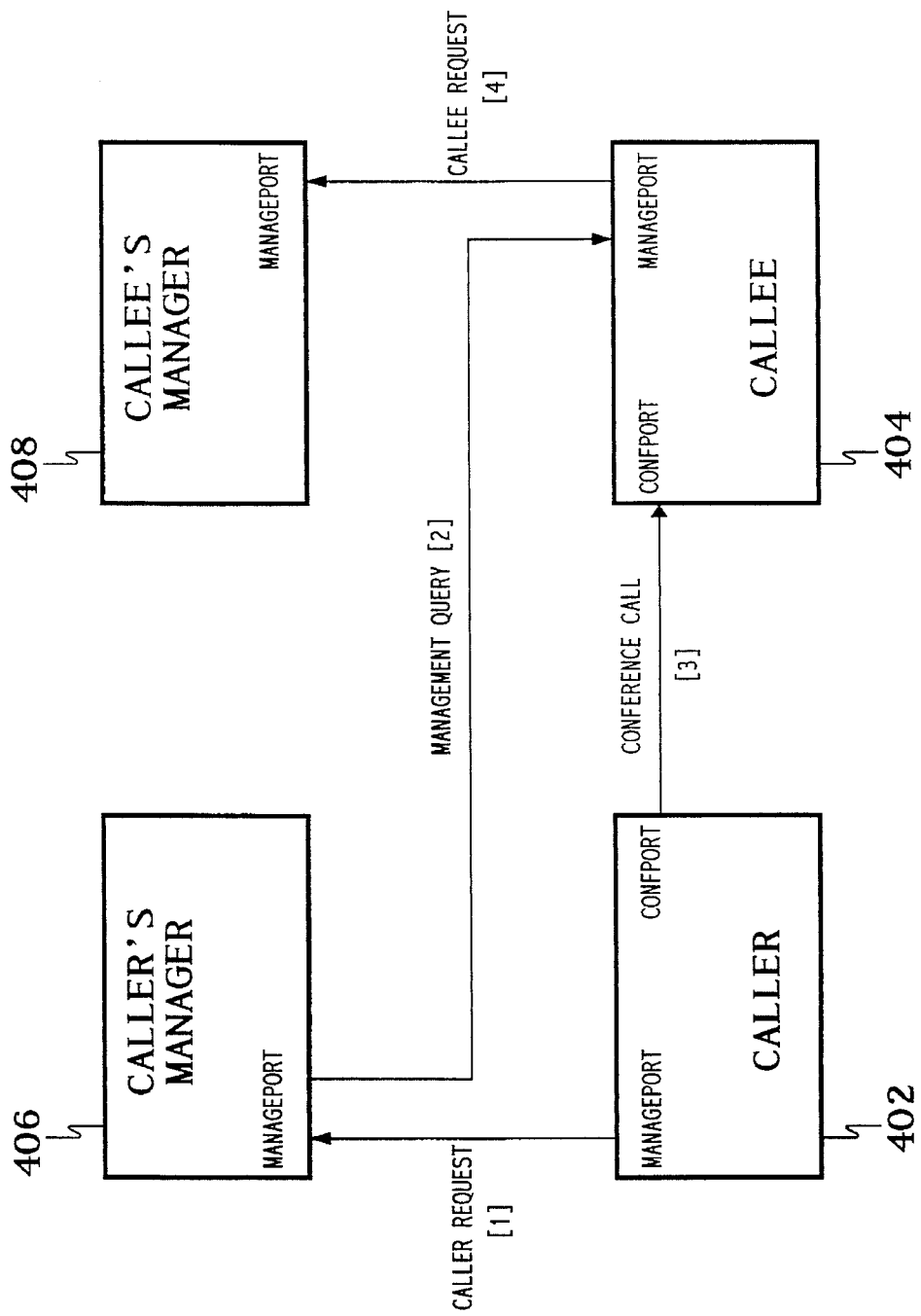
FIG. 4 is a block diagram showing the network connections made by the caller, callee, and their respective managers to initiate an external conference.

Referring now to FIG. 4, there is shown a block diagram showing the network connections made by caller 402, callee 404, and their respective managers 406 and 408 to initiate an external conference, according to a preferred embodiment of the present invention. To begin the process of initiating an external conference, caller 402 implements a caller request protocol to request permission from its manager 406 for the conference. Caller's manager 406 then implements a management query protocol to query callee 404 about its conferencing status. If callee 404 is available and if the bandwidth granted by the caller's manager 406 is sufficient for caller 402's purposes, then caller 402 calls callee 404 using its conferencing software application. Callee 404 then implements a callee request protocol to seek permission for the conference from its manager 408. The callee request is transmitted between the management port of callee 404 and the management port of callee's manager 408.

An advantage of the present invention is that a management computer does not need to maintain a static list of its client computers. Nor is there a need for some sort of network broadcast by either the client computers or the management computer. Rather, each client computer keeps track of its own management computer by means of a data file that contains the one or more network addresses for its management computer, and the caller's management computer queries the callee for the identity of the callee's management computer. Those skilled in the art will understand that a management computer may have a different network address for each network transport supported by the management computer. The client's data file may be instantiated by the network administrator either when a client computer is enabled (i.e., when its conferencing software application is installed) or when a central copy of such installation media is made available on some network server or other common facility.

Each management computer maintains a list of currently active conferences that involve at least one client computer associated with that management computer. The management computer preferably does not maintain a list of the client computers that are assigned to it. In a preferred embodiment, the list of active conferences consists of a set of records, where each record identifies the caller and callee of each active conference. The record also identifies the bandwidth allocated for that conference. The manager's list has only one record for each conference, even if a conference is a local conference. The manager's list is described in further detail later in this specification in the section entitled "Conferencing Protocols and Data Fields."

Conference Discovery and Aging

As described earlier in this specification in connection with FIGS. 2–4, when a caller wishes to initiate a conference, the caller seeks permission for the conference from its manager. Similarly, when a callee wishes to accept a conference from a caller, the callee seeks permission for the conference from its manager. If a client (i.e., the caller or callee) successfully contacts its manager, the client preferably abides by the decision of its manager with respect to proceeding with the conference.

In a preferred embodiment, if a client is unable to contact its manager, then the client assumes that it does not have permission to proceed with the conference. In an alternative preferred embodiment, however, if a client is unable to contact its manager to seek permission for the conference, the client may proceed with the conference anyway.

A client may be unable to contact its manager, if, for example, the manager is temporarily out of service. After the manager returns to service, if there is no way for the manager to update its information about the currently active conferences, the manager may allocate bandwidth (for subsequently requested conferences) that is already being used by conferences that began while the manager was out of service. As a result, the manager may allocate bandwidth that is in reality not available for conferencing. Such bandwidth allocation may adversely impact the operations of the network.

Under normal operating conditions, a client will inform its manager of the termination of a conference in which the client was participating. When that happens, the manager will know to delete the record for that conference from its list of active conferences and deallocate the bandwidth that was used for that conference. A client may, however, terminate a conference without informing its manager. For example, the client computer may experience a software or hardware failure that prevents it from notifying the manager that its conference has ended. In that case, the manager would continue to believe that the conference was active and may deny permission to another client seeking to initiate a different conference, since the manager would not know that the bandwidth that had been allocated to the first conference is actually not being used and could be used for the second conference. As a result, the manager may unnecessarily deny permission for conferences that the network could in actuality support.

Figure 5:
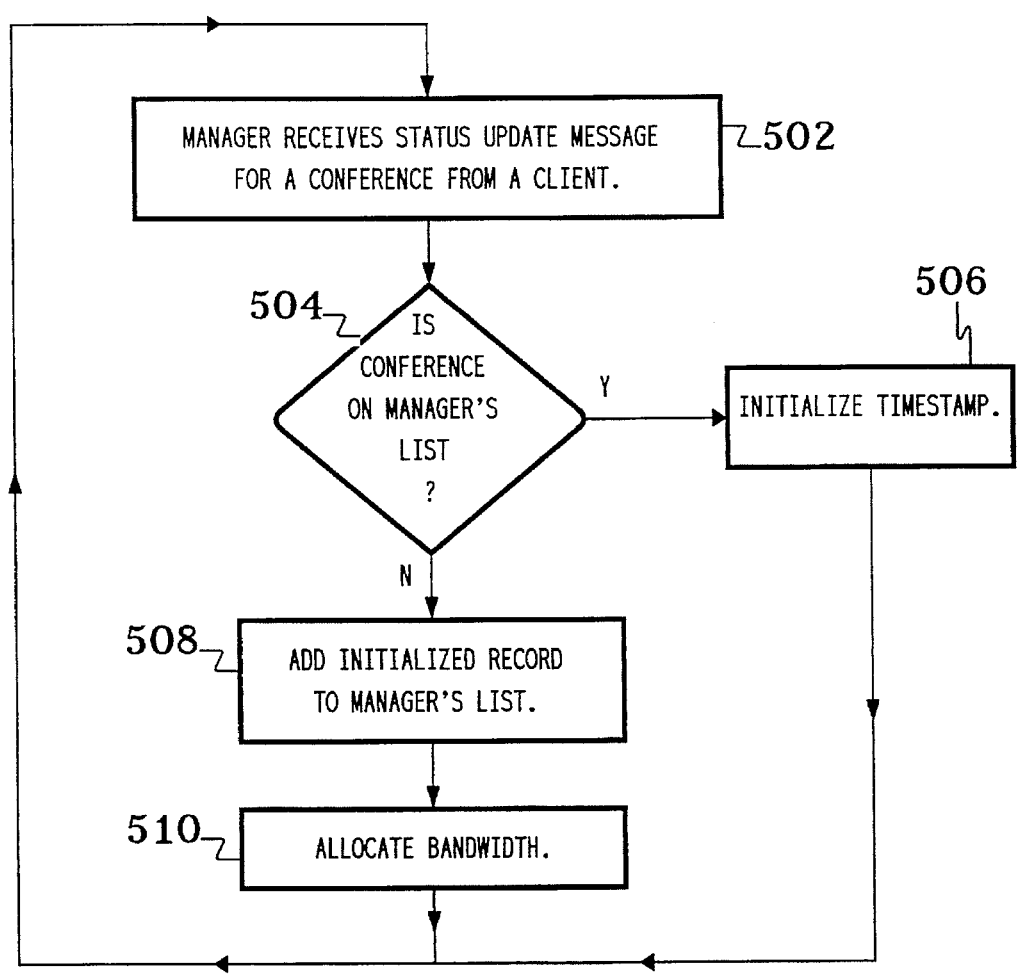
FIG. 5 is a flow diagram of the conference discovery processing of the computer network of FIG. 1.

Referring now to FIG. 5, there is shown a flow diagram of the conference discovery processing of computer network 100 of FIG. 1, according to a preferred embodiment of the present invention. The conference discovery processing is designed to avoid some of the aforementioned problems that may arise when managers and clients are temporarily unable to communicate. According to this processing, each client sends status update messages to its manager at substantially regular intervals. Each status update message preferably identifies: (1) the caller's address, (2) the callee's address, (3) whether the sender of the message is the caller or the callee, (4) the allocated bandwidth of the conference, and (4) other ancillary information of use to the manager (e.g., the names of the client users). In a preferred embodiment, each client sends a status update message approximately every 5 minutes.

When a manager receives a status update message from one of its clients (step 502 of FIG. 5), it compares the information in the message to its list of current conferences and updates the list accordingly. If the conference identified in the message is already on the manager's list (step 504), then the manager initializes (i.e., resets to zero) a timestamp in the list record for that conference (step 506). The timestamp indicates the length of time since the last status update message for that conference was received. In a preferred embodiment, the timestamp is a count of the number of specified time periods since the last message was received. In alternative embodiments, the timestamp may take other forms, such as the date and time of day when the last message was received.

If the identified conference is not on the manager's list (step 504), then the manager "discovers" a new conference that it did not know about. In that case, the manager adds a record for that conference to the list (with an initialized timestamp) (step 508) and allocates bandwidth for that conference (step 510). Processing returns to step 502 as subsequent status update messages are received by the manager from its clients.

When a manager discovers a new conference by receiving a status update message from one of its clients, the manager assumes that the client is involved in an external conference and the manager allocates bandwidth accordingly. If, in fact, the newly discovered conference is a local conference, the manager will eventually receive a status update message from the other of its clients involved in that conference. The manager will then recognize that the conference is a local conference and will adjust its allocation of bandwidth accordingly (i.e., potentially deallocate external bandwidth).

Figure 6:
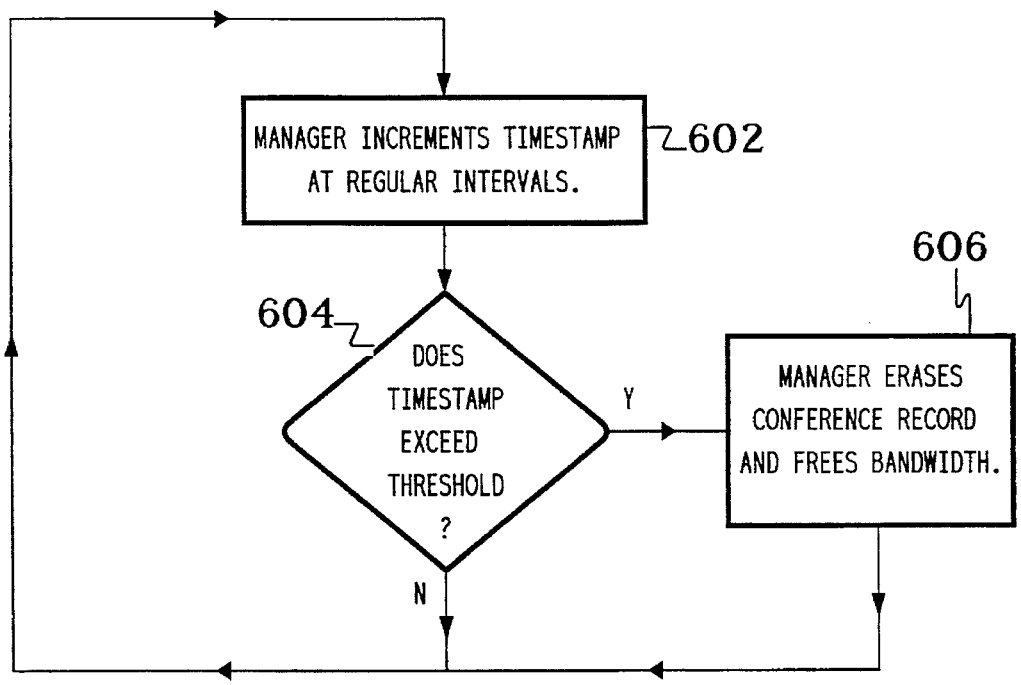
FIG. 6 is a flow diagram of the conference aging processing of the computer network of FIG. 1.

Referring now to FIG. 6, there is shown a flow diagram of the conference aging processing of computer network 100 of FIG. 1, according to a preferred embodiment of the present invention. The conference aging processing is designed to avoid some of the problems described earlier that may arise when managers and clients are temporarily unable to communicate. At regular intervals, the manager increments the timestamps of all of the records in its list of active conferences (step 602 of FIG. 6).

If the timestamp for any of the active conferences exceeds a specified threshold value (step 604), then the manager determines that that conference is no longer active and the manager erases the conference record from its list and deallocates the bandwidth that had been allocated for that conference (step 606). In a preferred embodiment, the specified threshold value is equivalent to three message cycles or about 15 minutes (to allow for the possibility of lost status update messages over the unreliable transport).

Through the implementation of the conference discovery and aging processing of FIGS. 5 and 6, the manager is able to discover those conferences that it did not explicitly authorize as well as recognize those conferences that have ended without notifying the manager. Those skilled in the art will understand that, through this strategy, the manager is able to maintain an accurate list of the active conferences and thereby improve the efficiency with which it allocates bandwidth for those conferences.

In a preferred embodiment of the present invention, when the manager discovers previously unknown conferences, the manager allows those conferences to continue. In an alternative preferred embodiment, the manager has the ability to terminate newly discovered conferences, if such action is appropriate.

Conferencing Management Protocols and Data Fields
Conferencing Management Protocols In the protocol definitions that follow, the management port is the same port on both the client and the manager. In an alternative preferred embodiment, the management port for the client is different from the management port for the manager. In this latter embodiment, the manager's computer may also participate in conferences (i.e., the manager may also be a client).

The management protocol suite (MPS) is the set of network protocols that allow the conferences of clients to be controlled by managers. The general goal of the MPS is to be separate from the client peer-to-peer protocol.

Common Data Types
MPSProtocolSuiteVersion

The MPSProtocolSuiteVersion data type is the initial byte of protocol traffic. It defines the overall suite of protocols being used by the sender and it supports polyversion support by the receiver. The MPSProtocolSuiteVersion data type is defined as follows:

```
typedef BYTE MPSProtocolSuiteVersion;
#define MPS_MAJORVERS(psvbyte) (((psvbyte)>>4)&0xF))
#define MPS_MINORVERS(psvbyte) ((psvbyte)&0xF)
```

The most significant 4 bits contain the major version and the least significant 4 bits the minor version.

MPSProtocolID

The MPSProtocolID data type is defined in the context of the protocol suite. The first message sent on an MPS connection will define the protocol ID for the rest of the connection (but see Management Query for an exception); thereafter the protocol ID is sent for debugging and completeness only. A ProtocolID in a message defines the purpose of the message. The MPSProtocolID data type is defined as follows:

```
typedef BYTE MPSProtocolID;
#define MPS_PID_* . . .
```

MPSSequenceNumber

The MPSSequenceNumber data type uniquely defines the message within a protocol. It is an unsigned nonzero number. The MPSSequenceNumber data type is defined as follows:

typedef BYTE MPSSequenceNumber;

MPSPeerNamesType

The MPSPeerNamesType data type is used to define the name of callee and caller in the MPS. The MPSPeerNamesType data type is defined as follows:

```
typedef struct {
    WORD        callernamesize;
    WORD        calleenamesize;
    char        namebuf[320];
} MPSPeerNamesType;
```

This type preferably appears as the last field of a message, so that decreasing the actual size of the namebuf subfield will allow the size of the message to be decreased when names are small, callernamesize and calleenamesize designate the size of the peer names in namebuf, exclusive of their terminating nulls. namebuf contains the caller name and the callee name. The names are null-terminated strings packed together with caller preceding callee. If this structure is the last item of a message, characters past the terminating NULL of the callee name in the namebuf is preferably not transmitted.

Connection Management Protocols

Caller Request

The caller request of FIGS. 3 and 4 involves the following steps:

(1) Caller makes a connection to caller's manager.

(2) Caller opens a channel to caller's manager.

(3) Caller sends MPSRConferenceRequestType to caller's manager.

(4) Caller's manager opens a channel to caller.

(5) Caller's manager sends MPSRConferenceResponseType to caller.

(6) Caller sends MPSRConfCallType to caller's manager.

(7) If MPSRConfCallType indicates that caller will call callee, then caller calls callee and then indicates whether it will actually embark on the conference by sending MPSRConfCommitType to caller's manager.

(8) Caller terminates the connection.

MPSRConferenceRequestType

The MPSRConferenceRequestType message is sent to the caller's manager by the caller requesting permission to conference. The MPSRConferenceRequestType message is defined as follows:

```
typedef struct {
    MPSProtocolSuiteVersion    version
    MPSProtocolID              id;
    MPSSequenceNumber          num;
    DWORD                      bandwidth;
    TADDR                      caller;
    TADDR                      callee;
} MPSRConferenceRequestType;
```

The bandwidth field is the bidirectional bandwidth, id is preferably MPS_ID_CALLERREQUEST. num is preferably 1. TADDR is an address structure. The TADDR address structure is defined as follows:

```
#define T_ADDR_LENGTH 80
typedef struct tag_TADDR {
    WORD     AddressType;
    WORD     AddressLength;
    BYTE     Address[T_ADDR_LENGTH];
} TADDR, FAR *LPTADDR;
```

The TADDR structure may be used for different LAN transports. The following defines how the information for a given transport address is mapped to the TADDR structure. For a NetBIOS transport, TADDR is used as follows:

```
typedef struct tag_NETBIOSADDR
    WORD     TransportID;        // Constant = 1
    WORD     AddressLength;
    BYTE     EndpointName[12];
    BYTE     Port[4];
} NETBIOSADDR, FAR *LPNETBIOSADDR;
```

The endpoint name is the computer's MAC address comprising 12 hex digit characters. For a Novell® IPX™ transport, TADDR is used as follows:

```
typedef struct tag_IPXADDR
{
    WORD     TransportID;        // Constant = 7
    WORD     AddressLength;
    BYTE     NetAddr[8];
    BYTE     MACAddr[12];
    BYTE     IPXPort[4];
} IPXADDR, FAR *LPIPXADDR;
```

For a UDP/IP transport, TADDR is used as follows:

```
typedef struct tag_UDPADDR
{
    WORD     TransportID;        // Constant = 8
    WORD     AddressLength;
    BYTE     IPAddr[16];
    BYTE     IPPort[4];
} UDPADDR, FAR *LPUDPADDR;
```

MPSRConferenceResponseType

The MPSRConferenceResponseType message is sent to the caller by the caller's manager either to allow or to disallow a conference. The MPSRConferenceResponseType message is defined as follows:

```
typedef enum {
    MPSR_Permitted=0;
    MPDR_Denied_NoBandwidth=1;
    MPSR_Denied_NoExternBandwidth=2;
    MPSR_Denied_CalleeConnFailed=3;
    MPSR_Denied_InternalError=200;
} MPSRConferencePermit;
typedef struct {
    MPSRProtocolSuite Version    version;
    MPSprotocolID                id;
    MPSSequenceNumber            num;
    MPSRConferencePermit         permit;
    DWORD                        bandwidth;
    MANERRORTYPE                 LastErrorType;
    MAININTERNALERROR            LastInternalError;
    TSTATUS                      LastCommError;
} MPSRConferenceResponseType;
```

The MPSConferencePermit field is a WORD. version is the MPS version number. id is preferably MPS_ID_CALLERREQUEST. num is preferably 2. The Last* fields support error reporting. They identify various internal errors that may occur in the comm system of the caller's manager.

MPSRConfCallType

The MPSRConfCallType message is sent by the caller to the caller's manager to indicate whether or not the caller intends to proceed with the conference. The MPSRConfCallType message is defined as follows:

```
typedef struct {
    MPSProtocolSuiteVersion    version;
    MPSProtocolID              id;
    MPSSequenceNumber          num;
    BOOL                       willcall;
} MPSRConfCallType;
```

When willcall is FALSE, receipt of this message by the manager concludes the data interchange of the Caller Request protocol. This message is structurally the same as its counterpart in the Callee Request protocol, but the Caller Request message names the boolean field willcall, whereas the Callee Request message names the boolean field willaccept. version is the MPS version number. id is preferably MPS_ID_CALLERREQUEST. num is preferably 3. will-call TRUE indicates that the caller will call, otherwise this message terminates the protocol.

MPSRConfCommitType

The MPSRConfCommitType message is sent by the caller to the caller's manager to indicate whether or not the caller intends to proceed with the conference. The MPSRConfCommitType message is defined as follows:

```
typedef struct {
    MPSProtocolSuiteVersion    version;
    MPSProtocolID              id;
    MPSSequenceNumber          num;
    BOOL                       commit;
    DWORD                      bandwidth;
    MPSPeerNamesType           names;
} MPSRConfCommitType;
```

If commit is FALSE, receipt of this message by the manager concludes the data interchange of the Caller Request protocol. version is the MPS version number. id is preferably MPS_ID_CALLERREQUEST. commit FALSE implies that the caller will not conference, TRUE implies that the caller will conference. num is preferably 4. If commit is TRUE, the bandwidth field will contain the final committed bandwidth for the upcoming conference. In a preferred embodiment, this is less than or equal to the bandwidth granted in MPSRConferenceResponseType. If commit is TRUE, then the names field designates 0, 1, or both of the peer names for the conference (callee and caller).

Management Query

The management query of FIGS. 3 and 4 involves the following steps:

(1) Caller's manager makes a connection to callee.

(2) Caller's manager opens a channel to callee.

(3) Caller's manager sends MPSManagementQuery to callee.

(4) Callee opens a channel to caller's manager.

(5) Callee sends MPSManagementQueryRespType.

(6) Callee closes connection.

All callees preferably run this protocol whether or not they are bound to a manager.

MPSManagementQueryType

MPSManagementQueryType is the first message of the Management Query protocol in which the manager contacts the callee to determine what manager is bound to the callee. The MPSManagementQueryType message is defined as follows:

```
typedef struct {
    MPSProtocolSuiteVersion    version;
    MPSProtocolID              id;
    MPSSequenceNumber          num;
    TADDR                      sequioa_addr;
} MPSManagementQueryType;
``` version is the MPS version number. id is preferably MPS_ID_MANAGEMENTQUERY. num is preferably 1. sequoia_addr is the address of the manager.

MPSManagementQueryRespType

MPSManagementQueryRespType is the callee's response to the caller's manager. The MPSManagementQueryRespType message is defined as follows:

```
typedef struct {
    MPSProtocolSuiteVersion    version;
    MPSProtocolID              id;
    MPSSequenceNumber          num;
    BOOL                       inconf;
    BOOL                       have_sequoia;
    TADDR                      sequoia_addr;
} MPSManagementQueryRespType;
```

The callee denotes which manager is bound to it (if any) by this message. version is the MPS version number. id is preferably MPS_ID_MANAGEMENTQUERY. num is preferably 2. inconf indicates whether the callee is involved in a conference. have_sequoia is TRUE if there is a manager bound to the callee. If have_sequoia is TRUE, sequoia_addr is the address of the manager bound to the callee.

Callee Request

The callee request of FIGS. 3 and 4 involves the following steps:

(1) Callee makes a connection to callee's manager.

(2) Callee opens a channel to callee's manager.

(3) Callee sends MPSEConferenceRequestType to callee's manager.

(4) Callee's manager opens a channel to callee.

(5) Callee's manager sends MPSEConferenceResponseType to callee.

(6) Callee sends MPSEConfCallType to the callee's manager.

(7) If MPSEConfCallType indicates that callee will accept the conference call from caller, then callee accepts caller's conference call and then indicates that it will actually embark on the conference by sending MPSEConfCommitType to callee's manager.

(8) Callee terminates the connection.

The following types are analogous to the types involved in the caller request protocol, but have different type names and a distinct protocol id.

MPSEConferenceRequeStType

The MPSEConferenceRequestType message is sent to the callee's manager by the callee requesting permission to conference. The MPSEConferenceRequestType message is defined as follows:

```
typedef struct {
    MPSProtocolSuiteVersion    version;
    MPSProtocolID              id;
    MPSSequenceNumber          num;
    DWORD                      bandwidth;
    TADDR                      caller;
    TADDR                      callee;
} MPSEConferenceRequestType;
```

Bandwidth field is the bidirectional bandwidth. id is preferably MPS_ID_CALLEEREQUEST. num is preferably 1.

MPSEConferenceResponseType

The MPSEConferenceResponseType message is sent io the callee by the callee's manager either to allow or to disallow a conference. The MPSEConferenceResponseType message is defined as follows:

```
typedef enum {
    MPSE_Permited=0;
    MPSE_Denied_NoBandwidth=1;
    MPSE_Denied_NoExternBandwidth=2;
    MPSE_Denied_InternalError=200;
```

```
} MPSEConferencePermit;
typedef struct {
    MPSProtocolSuiteVersion    version;
    MPSProtocolID              id;
    MPSSequenceNumber          num;
    MPSEConferencePermit       permit;
    DWORD                      bandwidth;
    MANERRORTYPE               LastErrorType;
    MANINTERNALERROR           LastInternalError;
    TSTATUS                    LastCommError;
} MPSEConferenceResponseType;
```

The MPSEConferencePermit field is a WORD. version is the MPS version number. id is preferably MPS_ID_CALLEEREQUEST. num is preferably 2. The Last* fields support error reporting. They identify various internal errors that may occur in the comm system of the manager.

MPSEConfCallType

The MPSEConfCallType message is sent by the callee to the callee's manager to indicate whether or not the callee intends to proceed with the conference. The MPSEConfCallType message is defined as follows:

```
typedef struct {
    MPSProtocolSuiteVersion    version;
    MPSProtocolID              id;
    MPSSequenceNumber          num;
    BOOL                       willaccept;
} MPSEConfCallType;
```

When willaccept is FALSE, receipt of this message by the callee's manager concludes the data interchange of the Callee Request protocol. version is the MPS version number. id is preferably MPS_ID_CALLEEREQUEST. num is preferably 3. willaccept TRUE indicates that the callee will accept, otherwise this message terminates the protocol. This message is structurally the same as its counterpart in the Caller Request protocol, but the Caller Request message names the boolean field willcall, whereas the Callee Request message names the boolean field willaccept.

MPSEConfCommitType

The MPSEConfCommitType message is sent by the callee to the callee's manager to indicate whether or not the callee intends to proceed with the conference. The MPSEConfCommitType message is defined as follows:

```
typedef struct {
    MPSProtocolSuiteVersion    version;
    MPSProtocolID              id;
    MPSSequenceNumber          num;
    BOOL                       commit;
    DWORD                      bandwidth;
    MPSPeerNamesType           names;
} MPSEConfCommitType;
```

Receipt of this message by the callee's manager concludes the data interchange of the Callee Request protocol. version is the MPS version number. id is preferably MPS_ID_CALLEEREQUEST. num is preferably 4. commit FALSE implies that the callee will not conference, TRUE implies that it will. If commit is TRUE, the bandwidth field will contain the final committed bandwidth for the upcoming conference. This is preferably less than or equal to the bandwidth granted in MPSEConferenceResponseType. If commit is TRUE, the names field designates 0, 1, or both of the peer names for the conference (callee and caller).

In-Conference Management Protocols
Conference Status

Clients (both callers and callees) send the MPSConferenceStatusType to their managers via unreliable datagrams periodically while they are conferencing.

MPSConferenceStatusType

The MPSConferenceStatusType message is delivered to the manager via unreliable datagram. Clients send this message periodically when they are in a conference. The MPSConferenceStatusType message is defined as follows:

```
typedef struct {
    MPSProtocolSuiteVersion    version;
    MPSProtocolID              id;
    TADDR                      caller;
    TADDR                      callee;
    DWORD                      bandwidth;
    MPSSenderRole              sender;
    MPSPeerNamesType           names;
} MPSConferenceStatusType;
``` version is the MPS version number. id is preferably MPS_ID_CONFERENCESTATUS. caller is the original conference caller. callee is the original conference callee. sender indicates whether the sender of the message is caller or callee. names defines 0, 1, or both of the peer names.

Conference Kill

Managers terminate conferences by sending the MPSKillConference message to its clients. In a preferred embodiment of the present invention, the manager sends the conference kill message to only local clients and, for local conferences, to only the callers.

MPSKillConference

The manager uses the MPSKillConference message to cause all the clients it knows about to shut down their conferences. The MPSKillConference message is defined as follows:

```
typedef struct {
    MPSProtocolSuiteVersion    version;
    MPSProtocol                id;
    MPSSequenceNumber          num;
    WORD                       minutes;
    char                       notification[81];
} MPSKillConference;
``` version is the MPS version number. id is preferably MPS_ID_KILLCONFERENCE. num is preferably 1. minutes designates how many minutes for the client to wait before shutting its conference down. The client preferably immediately warns the user about the shutdown in n minutes. The shutdown is carried out by the client n minutes after this message is received. If minutes is 0, the shutdown preferably takes place immediately. notification provides the means for the LAN administrator (i.e., manager user) to tell the client users why their conferences are being terminated. In a preferred embodiment, kill is accomplished with a datagram rather than a connection.

Connection Shutdown Management Protocols
Conference Shutdown

A client terminates a conference by sending the MPSConferenceShutdown message to its manager.

MPSConferenceShutdown

The client uses the MPSConferenceShutdown message to notify its manager that the client is leaving a conference. The MPSConferenceShutdown message is defined as follows:

```
typedef struct {
    MPSProtocolSuiteVersion    version;
    MPSProtocolID              id;
    MPSSequenceNumber          num;
    TADDR                      caller;
    TADDR                      callee;
} MPSConferenceShutdown;
``` version is the MPS version number. id is preferably MPS_ID_KILLCONFERENCE. num is preferably 1. caller and callee designate the original caller and callee of the conference. In a preferred embodiment, shutdown is accomplished with a datagram rather than a connection. The data sent is as specified above.

Conferencing Management Data Fields

The following documents the data fields that each management computer 102 keeps in a conference object. The conference object keeps track of the state of a conference that is attempted, ongoing, or shutting down.

Conference Object Fields:

| | | |
|---|---|---|
| MemObject | m_Mem; | // Used for memory allocation bookkeeping. |
| SMAN_EvBufType | m_EvBuf; | // Conference state data structure. |
| LPCSCRRQPROTOCOL | m_lpCallerRequest; | // Link to the caller request protocol object. |
| LPCSCERQPROTOCOL | m_lpCalleeRequest; | // Link to the callee request protocol object. |
| LPCSMQPRPTOCOL | m_lpManagementQuery; | // Link to mgt query prptocol object. |
| DWORD | m_bandwidthreq; | // Temporary variable. |
| LPCONFERENCE | m_Next; | // Link to the next conference in the chain of // all conferences. |
| DWORD | m_AgeInTicks; | // Counter updated and consulted in aging. |
| MANERRORTYPE | m_LastErrorType; | // Error codes. |
| MANINTERNALERROR | m_LastInternalError; | // Error codes. |
| TSTATUS | m_LastCommError; | // Error codes. |

Event Buffer Structure:

```
typedef struct {
    MPSConferenceStatusType    confStatus;      // Conference status structure.
    BYTE                       callerlocal;     // Flag indicating whether the caller is local.
    BYTE                       calleelocal;     // Flag indicating whether the callee is local.
    BOOL                       permitted;       // False means conference already discovered.
    DWORD                      validitymask;    // Indicates which of above fields and sibfields
                                                // are valid.
    SMAN_ConfStateType         confstate;       // Conference state enumeration.
} SMAN_Ev BufType;
```

Conference Status Structure:

```
typedef struct {
    MPSProtocolSuiteVersion    version;      // Suite of protocols used by sender.
    MPSProtocolID              id;           // Protocol ID.
    TADDR                      caller;       // Network address of caller.
    TADDR                      callee;       // Network address of callee.
    DWORD                      bandwidth;    // Bandwidth used by conference.
    MPSSenderRole              sender;       // Indicated whether sender is caller of callee.
    MPSPeerNamesType           names;        // Actual names of conferees (0-2 names).
} MPSConferenceStatusType;
```

Conference State Enumeration:

```
typedef enum {                    // Indicates what state the conference is in
    SMAN_CST_SHUTDOWN,                // Conference is going/gone.
    SMAN_CST_OVERDUE,                 // Conference is gone (aged to death).
    SMAN_CST_ONGOING,                 // Conference is happening.
    SMAN_CST_DENIED,                  // Caller didn't get permission due to bandwidth.
    SMAN_CST_CALLERQUIT,              // Caller decided not to conference.
    SMAN_CST_CALLEEREJECT,            // Callee decided not to conference.
    SMAN_CST_CALLEEUNREACH,           // Manager cannot make connection to callee.
    SMAN_CST_REQUESTINGPERM,          // Conferees are requesting permission to conference.
    SMAN_CST_CALLEEBUSY               // Callee is conferencing with someone else.
} SMAN_ConfStateType;
```

Preferred Hardware/Software Configuration

Referring again to FIG. 1, management computers 102 and client computers 104 are preferably Intel® microprocessor-based personal computers running Intel® ProShare™ conferencing software in a Microsoft® Windows™ operating system environment. A preferred embodiment of the Intel® ProShare™ conferencing software is described in U.S. patent application filed Nov. 16, 1994 using U.S. Express Mail Label No. EG029476017, entitled "Conferencing Over Multiple Transports" of Gunner Danneels, et al. The LANs and WAN of FIG. 1 may be any suitable local and wide area networks. For example, LAN 1 may be a Novell®, IP, or NetBIOS local area network. External links 106 and WAN link 108 are any links suitable for use with the particular LANs and WANs.

In a preferred embodiment, three different ports are used for the communications between clients and managers. As shown in FIGS. 3 and 4, the connection-based communications between a manager and a caller/callee uses a management port and the connection-based communications between a caller and a callee uses a conferencing port. The in-conferencing management messages (i.e., the unreliable datagrams) are preferably transmitted between a manager and a client using a datagram port.

The preferred ports for different types of transport are defined as follows. For a Novell® IPX™ transport:

| | | |
|---|---|---|
| static const char IPXAManagementPort[5] | = "8777"; | // client's management port |
| static const char IPXPtoPPort[5] | = "8778"; | // client's conferencing port |
| static const char IPXADGPort[5] | = "8779"; | // client's datagram port |
| static const char IPXSDGPort[5] | = "877A"; | // manager's datagram port |
| static const char IPXSManagementPort[5] | = "877B"; | // manager's management port |
| For a UDP/IP transport: | | |
| static const char UDPPtoPPort[5] | = "1653"; | // client's conferencing port |
| static const char UDPAManagementPort[5] | = "1654"; | // client's management port |
| static const char UDPADGPort[5] | = "1655"; | // client's datagram port |
| static const char UDPSManagementPort[5] | = "1651"; | // manager's management port |
| static const char UDPSDGport[5] | = "1652"; | // manager's datagram port |
| For a NetBIOS transport: | | |
| static const char NBPtoPPort[5] | = "FACE"; | // client's conferencing port |
| static const char NBAManagementPort[5] | = "FADE"; | // client's management port |
| static const char NBADGPort[5] | = "FAEE"; | // client's datagram port |
| static const char NBSManagementPort[5] | = "FAFE"; | // manager's management port |
| static const char NBSDGPort[5] | = "FA0E"; | // manager's datagram port |

Alternative Embodiments

The present invention covers embodiments other than the preferred embodiments described earlier in this specification. It will understood, for example, that the present invention may be adapted to cover multipoint conferencing (i.e., conferencing between more than two conferees) in addition to the point-to-point conferencing between two conferees described earlier.

Those skilled in the art will also understand that conferences other than audio/video conferences fall within the scope of the present invention. In general, conferences may involve different combinations of different data types (or single data types), such as audio, video, data sharing, and/or application sharing.

It will be further understood that the present invention applies to network architectures other than the architecture of FIG. 1. In general, the present invention applies to any packet-switched computer network. A packet-switched computer network is one in which there are no dedicated pipelines that guarantee fixed bandwidths for transmissions between the computers of the network. A packet-switched network differs from a circuit-switched network (e.g., a conventional POTS telephone line) which does provide pipelines with guaranteed, fixed amounts of bandwidth. For example, an alternative network architecture for the present invention may have a single management computer allocating bandwidth for clients arranged in two or more LANs that are interconnected with routers.

In a preferred embodiment, the clients and managers send messages as datagrams over unreliable transports. In alternative preferred embodiments, the messages may be transmitted over reliable transports.

In the preferred embodiment of FIG. 1, the management computer allocates bandwidth for conferences over a single transport. In alternative preferred embodiments, a management computer is capable of allocating bandwidths for conferences over different transports at the same time.

In a preferred embodiment, the present invention relates to the managing of bandwidth for conferences. In alternative embodiments, the present invention relates to managing of bandwidth for transmissions other than for conferences, such as for file transfer and video broadcasting.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer for a computer system comprising a management computer and one or more client computers interconnected over a computer network, wherein:

the computer is one of the management computer and a client computer;

the client computers can communicate over the computer network;

the management computer allocates bandwidth to the client computers for communication sessions over the computer network;

each client computer that is participating in an active communication session periodically transmits a message over the computer network to inform the management computer of current status of the active communication session; and if the management computer receives a message from a client computer about a communication session of which the management computer was not previously aware, then the management computer allocates bandwidth for the communication session.

2. The computer of claim 1, wherein the computer network is a packet-switched computer network.

3. The computer of claim 1, wherein each message identifies an address for a client computer that sent the message about a communication session, an address for another computer participating in the communication session, and an amount of bandwidth allocated for the communication session.

4. The computer of claim 1, wherein, if the management computer fails for a specified duration to receive a message from a client computer about a communication session of which the management computer was previously aware, then the management computer deallocates bandwidth for the communication session.

5. The computer of claim 1, wherein, if the management computer receives a message from a client computer about a communication session of which the management computer was not previously aware and if there is insufficient bandwidth for the communication session, then the management computer instructs one or more of its client computers to terminate their communication sessions.

6. The computer of claim 5, wherein, if the management computer fails for a specified duration to receive a message from a client computer about a communication session of which the management computer was previously aware, then the management computer deallocates bandwidth for the communication session.

7. The computer of claim 1, wherein:

when the management computer receives a message from a first client computer about a first communication session of which the management computer was not previously aware, then the management computer adds the first client computer and the first communication session to the list and allocates external bandwidth for the first communication session as an external communication session; and if, before the first communication session is terminated, the management computer subsequently receives a message from a second client computer about the first communication session, then the management computer deallocates the external bandwidth for the first communication session and allocates local bandwidth for the first communication session as a local communication session.

8. The computer of claim 7, wherein:

if the management computer fails for a specified duration to receive a message from a client computer about a communication session of which the management computer was previously aware, then the management computer deallocates bandwidth for the communication session;

if the management computer receives a message from a client computer about a communication session of which the management computer was not previously aware and if there is insufficient bandwidth for the communication session, then the management computer instructs one or more of its client computers to terminate their communication sessions;

the computer network is a packet-switched computer network; and each message identifies an address for a client computer that sent the message about a communication session, an address for another computer participating in the communication session, and an amount of bandwidth allocated for the communication session.

9. A computer for a computer system comprising a management computer and one or more client computers interconnected over a computer network, wherein:

the computer is one of the management computer and a client computer;

the client computers can participate in one or more communication sessions over the computer network;

the management computer allocates bandwidth to the client computers for the communication sessions over the computer network;

each client computer that is participating in an active communication session periodically transmits a message over the computer network to inform the management computer of current status of the active communication session; and if the management computer fails for a specified duration to receive a message from a client computer about a communication session of which the management computer was previously aware, then the management computer deallocates bandwidth for the communication session.

10. The computer of claim 9, wherein the computer network is a packet-switched computer network.

11. The computer of claim 9, wherein, if the management computer receives a message from a client computer about a communication session of which the management computer was not previously aware and if there is insufficient bandwidth for the communication session, then the management computer instructs one or more of its client computers to terminate their communication sessions.

12. The computer of claim 11, wherein:

the computer network is a packet-switched computer network; and each message identifies an address for a client computer that sent the message about a communication session, an address for another computer participating in the communication session, and an amount of bandwidth allocated for the communication session.

13. A computer for a computer system comprising a management computer and one or more client computers interconnected over a computer network, wherein:

the computer is one of the management computer and a client computer;

the client computers can participate in one or more communication sessions over the computer network;

the management computer allocates bandwidth to the client computers for the communication sessions over the computer network;

each client computer that is participating in an active communication session periodically transmits a message over the computer network to inform the management computer of current status of the active communication session; and if the management computer receives a message from a client computer about a communication session of which the management computer was not previously aware and if there is insufficient bandwidth for the communication session, then the management computer instructs one or more of its client computers to terminate their communication sessions.

14. The computer of claim 13, wherein the computer network is a packet-switched computer network.

15. The computer of claim 14, wherein each message identifies an address for a client computer that sent the message about a communication session, an address for another computer participating in the communication session, and an amount of bandwidth allocated for the communication session.

* * * * *